(12) United States Patent
Wichary et al.

(10) Patent No.: US 11,149,814 B2
(45) Date of Patent: Oct. 19, 2021

(54) COVER SYSTEM FOR DAMPER

(71) Applicant: Tenneco Automotive Operating Company Inc., Lake Forest, IL (US)

(72) Inventors: Lukasz Wichary, Grunwaldzka (PL); Grzegorz Tomczuk, Gozdzikow (PL); Tomasz Gorski, Familijna (PL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 16 days.

(21) Appl. No.: 16/257,468

(22) Filed: Jan. 25, 2019

(65) Prior Publication Data

US 2019/0170205 A1 Jun. 6, 2019

(51) Int. Cl.
| | |
|---|---|
| *F16F 9/38* | (2006.01) |
| *B60G 7/00* | (2006.01) |
| *F15B 15/14* | (2006.01) |
| *F16F 9/18* | (2006.01) |
| *B60G 13/08* | (2006.01) |

(52) U.S. Cl.
CPC ............... *F16F 9/38* (2013.01); *B60G 7/001* (2013.01); *B60G 13/08* (2013.01); *F15B 15/1423* (2013.01); *F16F 9/18* (2013.01); *B60G 2202/24* (2013.01); *B60G 2204/4308* (2013.01); *B60G 2206/41* (2013.01)

(58) Field of Classification Search
CPC ........ F16F 9/38; F16F 9/18; F16F 9/42; F16F 9/15; F16F 9/185; F16F 2230/0023; F16F 13/06; F16F 2222/12; F16F 2224/02; F16F 2226/04; F15B 15/1423; B60G 13/08; B60G 7/001; B60G 2204/4308; B60G 2204/40; B60G 2206/41; B60G 2202/24; B60G 3/01; B60G 99/00; B60G 11/14; B60G 15/066; B60G 15/063; F16J 3/046
USPC .......... 188/322.12, 322.16–322.17; 267/120, 267/122, 220, 221; 280/124.146, 124.147
See application file for complete search history.

(56) References Cited

U.S. PATENT DOCUMENTS

| | | | |
|---|---|---|---|
| 7,891,644 | B2 | 2/2011 | Watanabe et al. |
| 9,127,742 | B2 | 9/2015 | Nowotka |
| 9,476,476 | B2 | 10/2016 | Takeo |
| 9,976,623 | B2 | 5/2018 | Murata |
| 2002/0189441 | A1* | 12/2002 | Collis .................. F16F 9/58 92/165 R |
| 2003/0218286 | A1* | 11/2003 | Miyazaki ............ F16F 1/126 267/220 |

(Continued)

FOREIGN PATENT DOCUMENTS

| | | |
|---|---|---|
| EP | 1493939 | 1/2006 |
| GB | 1384012 | 2/1974 |

(Continued)

*Primary Examiner* — Robert A. Siconolfi
*Assistant Examiner* — San M Aung
(74) *Attorney, Agent, or Firm* — McGarry Bair PC

(57) ABSTRACT

A cover system for a damper includes an outer tube and a piston rod extending from an end of the outer tube. The cover system also includes a dust tube disposed around a portion of the outer tube. The dust tube includes a first end located proximal to the end of the outer tube and a second end opposite to the first end. The dust tube at least partially encloses the piston rod. The cover system further includes a cap connected to the outer tube. The cap is adapted to at least partially cover the first end of the dust tube.

20 Claims, 17 Drawing Sheets

(56) References Cited

U.S. PATENT DOCUMENTS

| | | | | |
|---|---|---|---|---|
| 2004/0168871 A1* | 9/2004 | Handke | | B60G 15/062 |
| | | | | 188/322.12 |
| 2005/0242542 A1* | 11/2005 | Handke | | B60G 15/068 |
| | | | | 280/124.155 |
| 2009/0145707 A1* | 6/2009 | Henneberg | | F16F 9/38 |
| | | | | 188/322.12 |
| 2014/0131961 A1* | 5/2014 | Moore | | F16F 1/121 |
| | | | | 280/6.157 |
| 2015/0204409 A1* | 7/2015 | Takeo | | F16F 9/38 |
| | | | | 188/322.19 |
| 2016/0075207 A1* | 3/2016 | Tsunekawa | | B60G 3/01 |
| | | | | 280/124.179 |
| 2016/0089952 A1* | 3/2016 | Kato | | F16J 3/041 |
| | | | | 267/292 |
| 2016/0341272 A1 | 11/2016 | Kawabe et al. | | |
| 2017/0089419 A1* | 3/2017 | Ando | | B29C 49/48 |

FOREIGN PATENT DOCUMENTS

| | | |
|---|---|---|
| GB | 2211269 | 9/1991 |
| JP | 2007218349 | 8/2007 |

\* cited by examiner

COVER SYSTEM FOR DAMPER

TECHNICAL FIELD

The present disclosure generally relates to dampers. More particularly, the present disclosure relates to a cover system for a damper.

BACKGROUND

Vehicles generally include dampers that are used in conjunction with suspension systems to absorb unwanted vibrations which occur while driving the vehicle. In order to absorb the vibrations, dampers are generally connected between a body and the suspension system of the vehicle.

Dampers are typically equipped with a dust tube, also known as an accordion gaiter or bellows-type gaiter, to prevent dust intrusion into the damper. The dust tube is equipped with ventilation channels. The ventilation channels allow entry and expulsion of air during a movement of the dust tube. Further, during an expansion of the dust tube, air and associated external material, such as sand, dust particles, or water may get sucked into a compartment of the dust tube. In dampers, the ventilation channels are positioned such that water or dust particles cannot enter the dust tube. However, in certain applications, especially when the damper is mounted in an upside-down configuration, water and sand/dust particles can easily enter the dust tube compartment through the ventilation channels. Such ingress of water, sand, or dust particles may damage a sealing system of the damper and/or a piston rod of the damper which may in turn cause oil leakage issues and incur significant costs.

Given description covers one or more above mentioned problems and discloses a damper to solve the problems.

SUMMARY

In an aspect of the present disclosure, a cover system for a damper is provided. The cover system includes an outer tube and a piston rod extending from an end of the outer tube. The cover system also includes a dust tube disposed around a portion of the outer tube. The dust tube includes a first end located proximal to the end of the outer tube and a second end opposite to the first end. The dust tube at least partially encloses the piston rod. The cover system further includes a cap connected to the outer tube. The cap is adapted to at least partially cover the first end of the dust tube.

In some embodiments, the cap is connected to the dust tube.

In some embodiments, the cap includes a projection adapted to be detachably connected to a groove of the outer tube.

In some embodiments, the cap includes a plurality of connecting tabs spaced apart from each other. Each of the plurality of connecting tabs includes a projection adapted to be detachably connected to a groove of the outer tube.

In some embodiments, the cap includes a first part and a second part connected to the first part by a snap-fit connection.

In some embodiments, the cap includes a cover portion disposed around the outer tube and adapted to at least partially cover the first end of the dust tube, and an extending portion extending from the cover portion towards the dust tube.

In some embodiments, the extending portion is connected to the dust tube.

In some other embodiments, the extending portion is spaced apart from the dust tube.

In some embodiments, the cap includes a plurality of through apertures.

In some embodiments, the cap includes a plurality of slots spaced apart from each other and a plurality of recess spaced apart from each other. Each of the plurality of recesses is disposed adjacent to a corresponding slot of the plurality of slots. Further, each of the plurality of recesses is adapted to receive a filter insert.

In some embodiments, the dust tube further includes a plurality of channels disposed proximal to the first end of the dust tube.

In another aspect of the present disclosure, a damper is provided. The damper includes an outer tube and a piston rod extending from an end of the outer tube. The damper also includes a dust tube disposed around a portion of the outer tube. The dust tube includes a first end located proximal to the end of the outer tube and a second end opposite to the first end. Further, the dust tube at least partially encloses the piston rod. The damper further includes a cap connected to the outer tube. The cap is adapted to at least partially cover the first end of the dust tube.

In yet another aspect of the present disclosure, a cover system for a damper is provided. The cover system includes an outer tube and a piston rod extending from an end of the outer tube. The cover system includes a dust tube disposed around a portion of the outer tube. The dust tube includes a first end located proximal to the end of the outer tube and a second end opposite to the first end. Further, the dust tube at least partially encloses the piston rod. The cover system also includes a cap connected to the outer tube. The cap includes a cover portion disposed around the outer tube and adapted to at least partially cover the first end of the dust tube. The cap also includes an extending portion extending from the cover portion towards the dust tube. The extending portion is at least one of connected to the dust tube and spaced apart from the dust tube.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
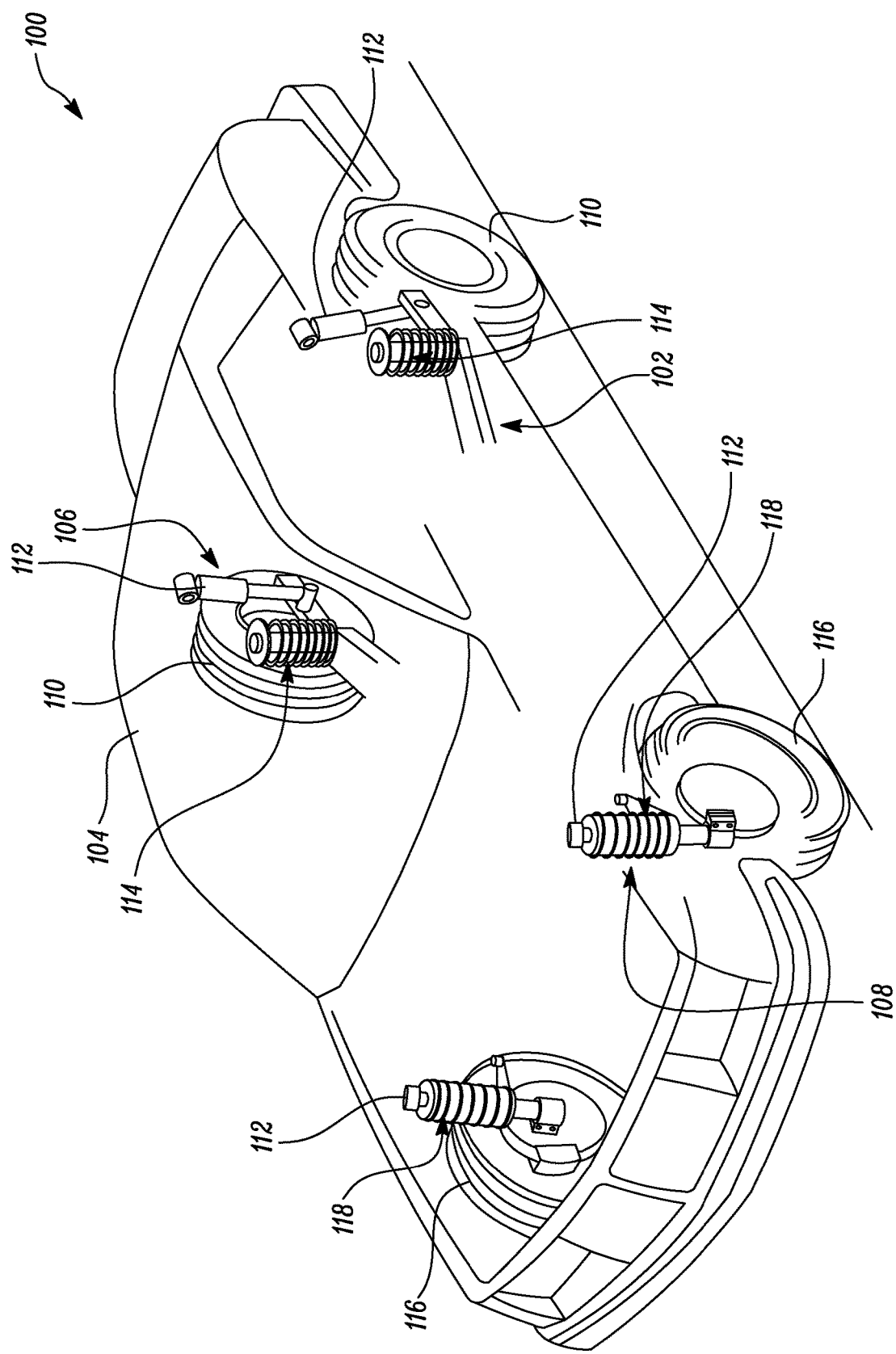
FIG. 1 is an illustration of a vehicle incorporating a suspension system, according to an aspect of the present disclosure.

FIG. 1 illustrates an exemplary vehicle 100 incorporating a suspension system 102 in accordance with the present disclosure. The vehicle 100 may include a vehicle driven by an internal combustion engine, an electric vehicle, or a hybrid vehicle. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative embodiment, the vehicle 100 may include an independent suspension unit (not shown) for each of the four corners instead of front and rear axle assemblies.

The dampers 112 of the suspension system 102 serve to damp the relative movement of the unsprung portion (i.e., the front and rear suspensions 108, 106) and the sprung portion (i.e., the body 104) of the vehicle 100. While the vehicle 100 has been depicted as a passenger car, the dampers 112 may be used with other types of vehicles. Examples of such vehicles include buses, trucks, off-road vehicles, and so forth. Furthermore, the term "damper 112" as used herein will refer to dampers 112 in general and will include shock absorbers, McPherson struts, and semi-active and active suspensions.

In some embodiments, a damping characteristic of each of the dampers 112 is adjustable. In order to automatically adjust each of the dampers 112, an electronic controller (not shown) may be electrically connected to the dampers 112. The controller may control an operation of each of the dampers 112 in order to provide appropriate damping characteristics resulting from movements of the body 104 of the vehicle 100. Further, the controller may independently control each of the dampers 112 in order to independently control a damping level of each of the dampers 112. The controller may be electrically connected to the dampers 112 via wired connections, wireless connections, or a combination thereof.

Figure 2:
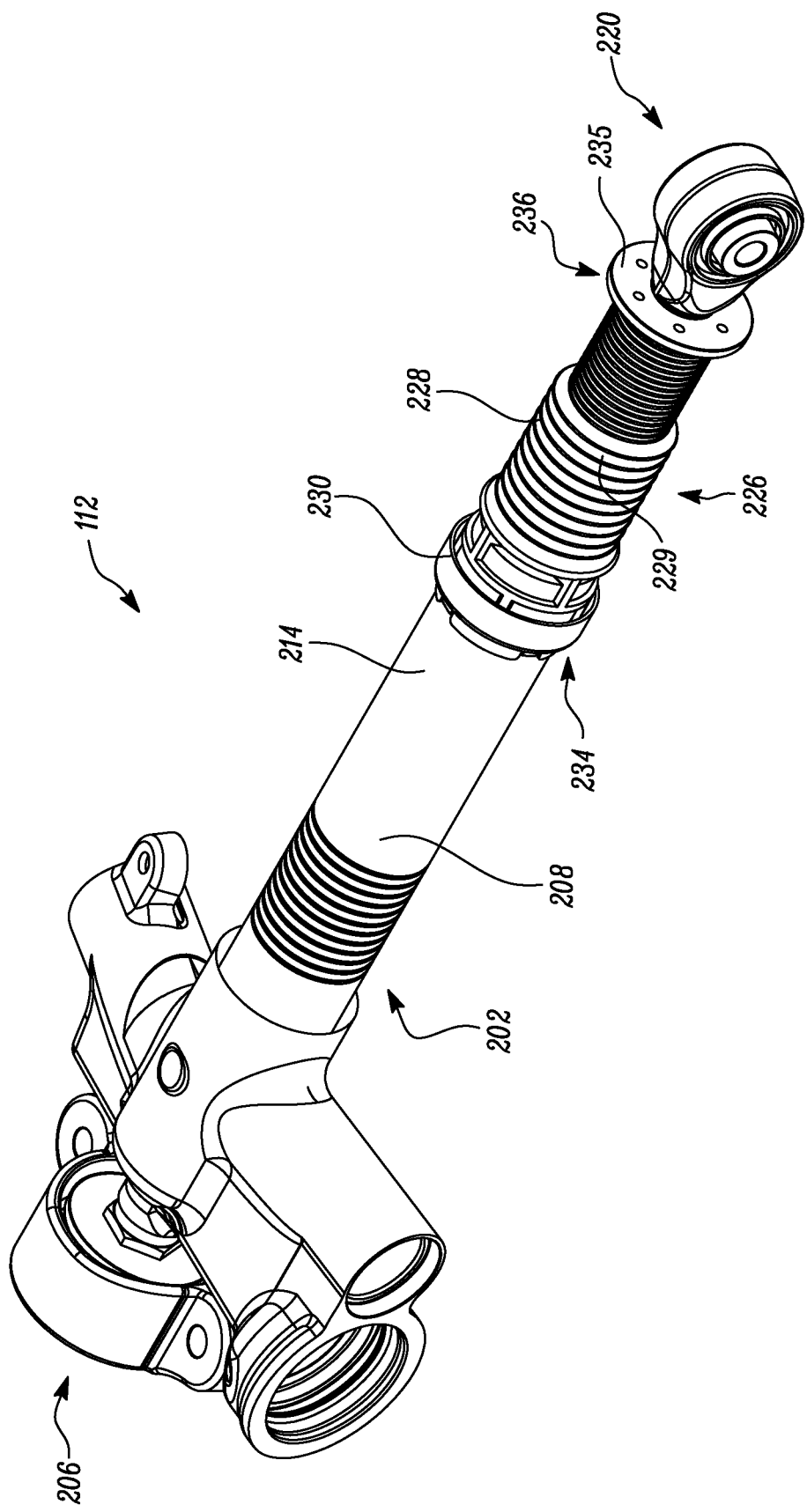
FIG. 2 is perspective view of a damper associated with the suspension system of FIG. 1, according to an aspect of the present disclosure.

FIG. 2 illustrates a perspective view of the damper 112. The damper 112 may be any of the four dampers 112 of the vehicle 100. The dampers 112 may include a Continuously Variable Semi-Active Suspension system (CVSA) damper or a shock absorber, without any limitations. In the illustrated embodiment, the dampers 112 are mounted in an upside-down configuration, such as in high speed vehicles. More particularly, a damper body 202 of the damper 112 is coupled with the body 104 (see FIG. 1) of the vehicle 100 (see FIG. 1) and a piston rod 204 (see FIG. 3) of the damper 112 is coupled with the suspension system 102 (see FIG. 1). Therefore, fluid chambers of the damper 112 are above the piston rod 204. However, it should be noted that the dampers 112 can be mounted in a configuration wherein the piston rod 204 is coupled with the body 104 and the damper body 202 is coupled with the suspension system 102. Further, the damper 112 includes a first mounting arrangement 206 to connect the damper body 202 with the body 104. In one example, the first mounting arrangement 206 may include mechanical fasteners that connect the damper body 202 with the body 104. Additionally, a coil spring (not shown) may be disposed around the damper 112 to further isolate the body 104 from the suspension system 102.

Figure 3:
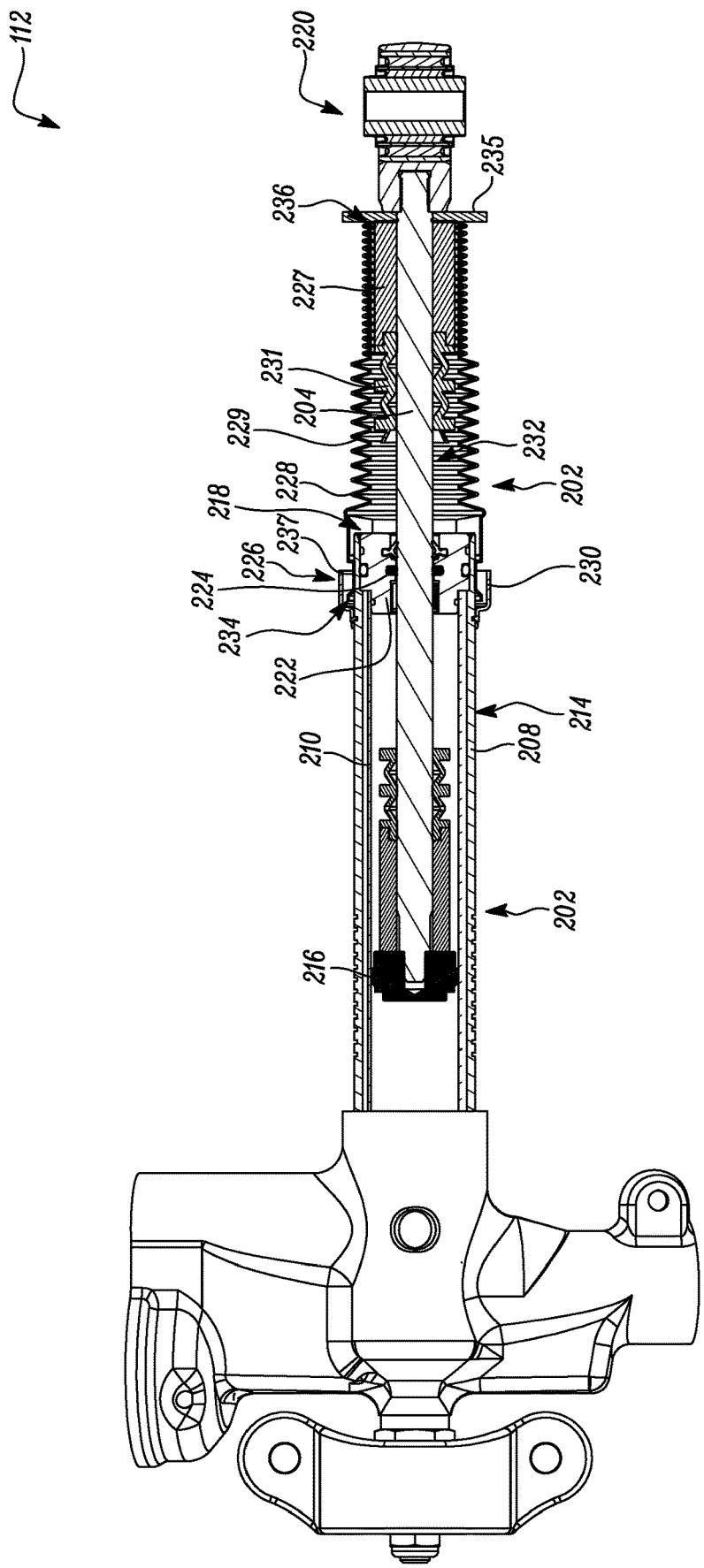
FIG. 3 is a sectional view of the damper shown in FIG. 2, wherein the damper includes a dust tube and a cap, according to an aspect of the present disclosure.

The damper 112 may contain a fluid which can be a hydraulic fluid or oil. Referring now to FIG. 3, the damper 112 includes an outer tube 208 and an inner tube 210. The outer and inner tubes 208, 210 form a part of the damper body 202. In one example, the outer tube 208 is embodied as a reserve tube. The outer tube 208 defines a groove 212 (shown in FIG. 6). In one example, the groove 212 is embodied as a continuous annular groove that circumferentially extends along an outer surface 214 of the outer tube 208. In another example, the outer tube 208 includes a number of discontinuous grooves that are spaced apart from each other along a circumference of the outer tube 208.

A piston 216 is slidably disposed within the inner tube 210. The damper 112 also includes the piston rod 204. One end of the piston rod 204 is connected to the piston 216 and reciprocates with the piston 216 whereas another end of the piston rod 204 is connected to the suspension system 102 of the vehicle 100. Further, the piston rod 204 extends from an end 218 of the outer tube 208. More particularly, the piston rod 204 is slidably received through the end 218 of the outer tube 208 and reciprocates with respect to the outer tube 208. The piston rod 204 may be connected to the suspension system 102 using a second mounting arrangement 220. The second mounting arrangement 220 may connect the piston rod 204 with the suspension system 102 using mechanical fasteners, such as bolts, screws, bearings, etc. Further, a sealing arrangement 222 including one or more sealing rings 224 is disposed proximal to the end 218 of the outer tube 208 for sealing the fluid within the damper 112.

The damper 112 also includes a cover system 226. The cover system 226 includes a dust tube 228 and a cap 230. In one example, the dust tube 228 is embodied as an accordion gaiter or a bellows-type gaiter. The cover system 226 also includes a sleeve 227 that acts as a spacer. In one example, the sleeve 227 may be made of a plastic material, such as polyamide. Further, the dust tube 228 includes a flexible tube. In the illustrated example, the dust tube 228 includes bellows 229 such that the dust tube 228 can deform with the reciprocation of the piston rod 204. In an embodiment, the cover system 226 may enclose an elastomeric jounce bumper 231 and a bumper cap (not shown). The jounce bumper 231 engages with the bumper cap during relatively large compression movements of the damper 112. The jounce bumper 231 and the bumper cap may be disposed around the piston rod 204. The dust tube 228 protects the piston rod 204 from dust, sand, water, or other contaminants.

In one example, the dust tube 228 may include a hollow cylindrical body that defines a compartment 232. The dust tube 228 is disposed around a portion of the outer tube 208. In one example, the dust tube 228 is concentrically disposed around the outer tube 208. Further, the dust tube 228 partially encloses the piston rod 204. The dust tube 228 includes a first end 234 and a second end 236 opposite to the first end 234. The first and second ends 234, 236 may be hollow ends of the dust tube 228. The first end 234 is located proximal to the end 218 of the outer tube 208. The dust tube 228 may be connected to a support member 235 at the second end 236. The dust tube 228 defines an opening (not shown) at the second end 236 of the dust tube 228 in order to allow the piston rod 204 to extend therethrough. The support member 235 may be connected to the piston rod 204. A narrow portion 237 of the dust tube 228 may also be received on the outer tube 208. It should be noted that the dust tube 228 can be formed from plastic, elastic material, metal, a composite material, or any suitable material.

Further, the compartment 232 of the dust tube 228 receives a portion of the outer tube 208 and a portion of the piston rod 204. The dust tube 228 also includes a plurality of channels 238 (shown in FIG. 6). The channels 238 are disposed proximal to the first end 234 of the dust tube 228. In the illustrated example, the dust tube 228 includes six channels 238. However, a number of the channels 238 may vary, based on application requirements. The channels 238 allow entry and expulsion of air from the dust tube 228. Additionally, the dust tube 228 includes drain holes (not shown) provided at a bottom end for draining water or other fluids that may seep into the dust tube 228. During a compression of the dust tube 228, the channels 238 expel air out of the damper 112. Further, during an expansion of the dust tube 228, water or air and its contents, such as dust or sand particles, may enter into the compartment 232. In order to prevent an ingress of contaminants into the dust tube 228 and the damper 112, the cover system 226 includes the cap 230.

Figure 4:
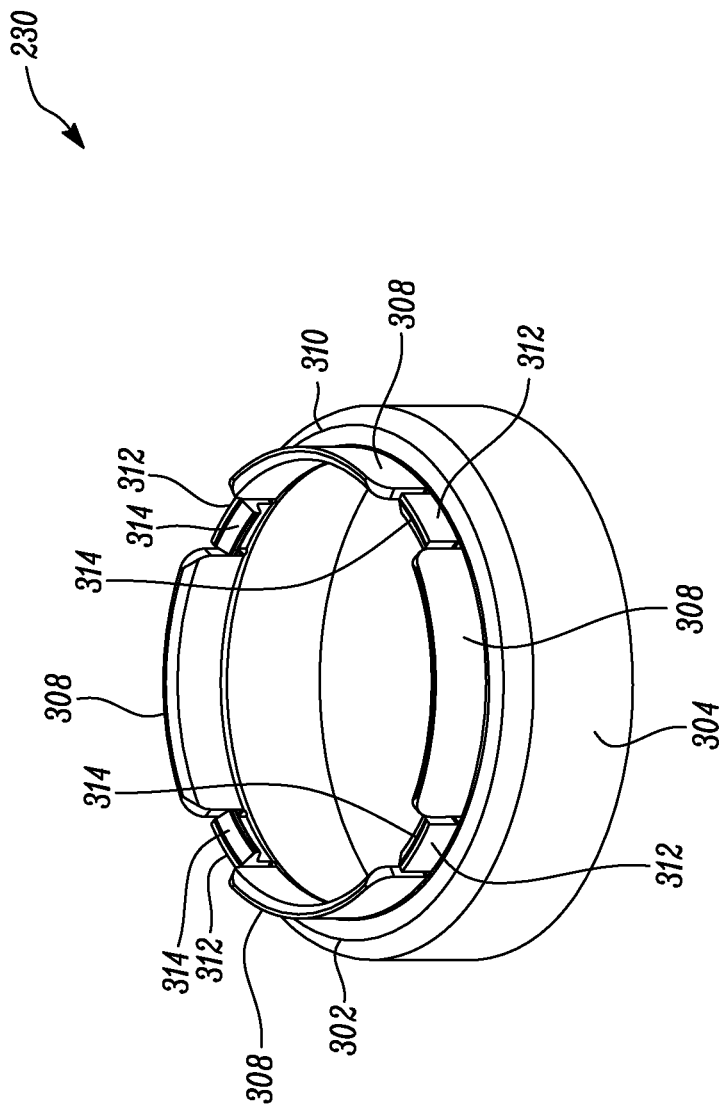
FIGS. 4 and 5 illustrate perspective views of the cap, according to an aspect of the present disclosure.
Figure 5:
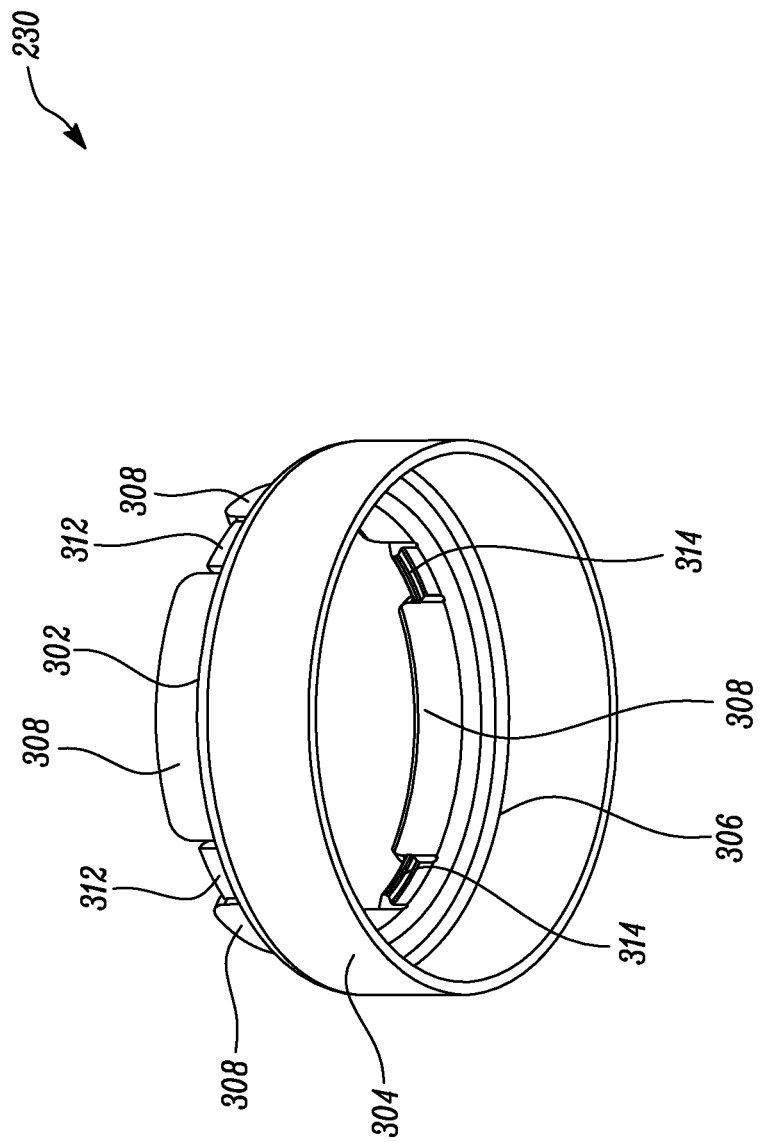

The cap 230 is embodied as a single piece component. In one embodiment of the present disclosure, the cap 230 is connected to the outer tube 208. Further, the cap 230 at least partially covers the first end 234 of the dust tube 228. More particularly, the cap 230 may include an arrangement that allows venting of the dust tube 228. As shown in FIGS. 4 and 5, the cap 230 includes a cover portion 302 and an extending portion 304. The cover portion 302 is disposed around the outer tube 208 (see FIG. 6) and at least partially covers the first end 234 (see FIG. 6) of the dust tube 228. The cover portion 302 may be concentric with the outer tube 208. The cover portion 302 is embodied as an inclined annular member. Further, the extending portion 304 extends from the cover portion 302 towards the dust tube 228 (see FIG. 6). More particularly, the extending portion 304 extends vertically downwards from a lower surface 306 (shown in FIG. 5) of the cover portion 302. The extending portion 304 is embodied as an annular member. In the illustrated embodiment, the extending portion 304 is spaced apart from the dust tube 228. More particularly, the extending portion 304 is radially spaced apart from the dust tube 228. The extending portion 304 and the dust tube 228 define a space 305 (shown in FIG. 6) therebetween. The space 305 allows venting of the dust tube 228. The space 305 allows entry and expulsion of air from the dust tube 228 during compression and expansion of the bellows 229 (see FIGS. 2 and 3) of the dust tube 228. More particularly, air introduced at the first end 234 of the cap 230 via the space 305 flows through the channels 238 (see FIGS. 6 and 9) and enters the dust tube 228. Further, air may be expelled out of the dust tube 228 via the channels 238 such that air travels out through the first end 234 and the space 305 and is discharged to the environment.

The cap 230 includes a number of vertical members 308 that are spaced apart from each other. More particularly, the vertical members 308 are circumferentially spaced apart from each other. In the illustrated embodiment, the cap 230 includes four vertical members 308. However, a total number of the vertical members 308 may vary as per application requirements. The vertical members 308 extend from an upper surface 310 (shown in FIG. 4) of the cover portion 302 and are designed to prevent any ingress of foreign particles into the dust tube 228. In an assembled condition of the cap 230, the vertical members 308 partially surround the outer surface 214 (see FIG. 2) of the outer tube 208.

Figure 6:
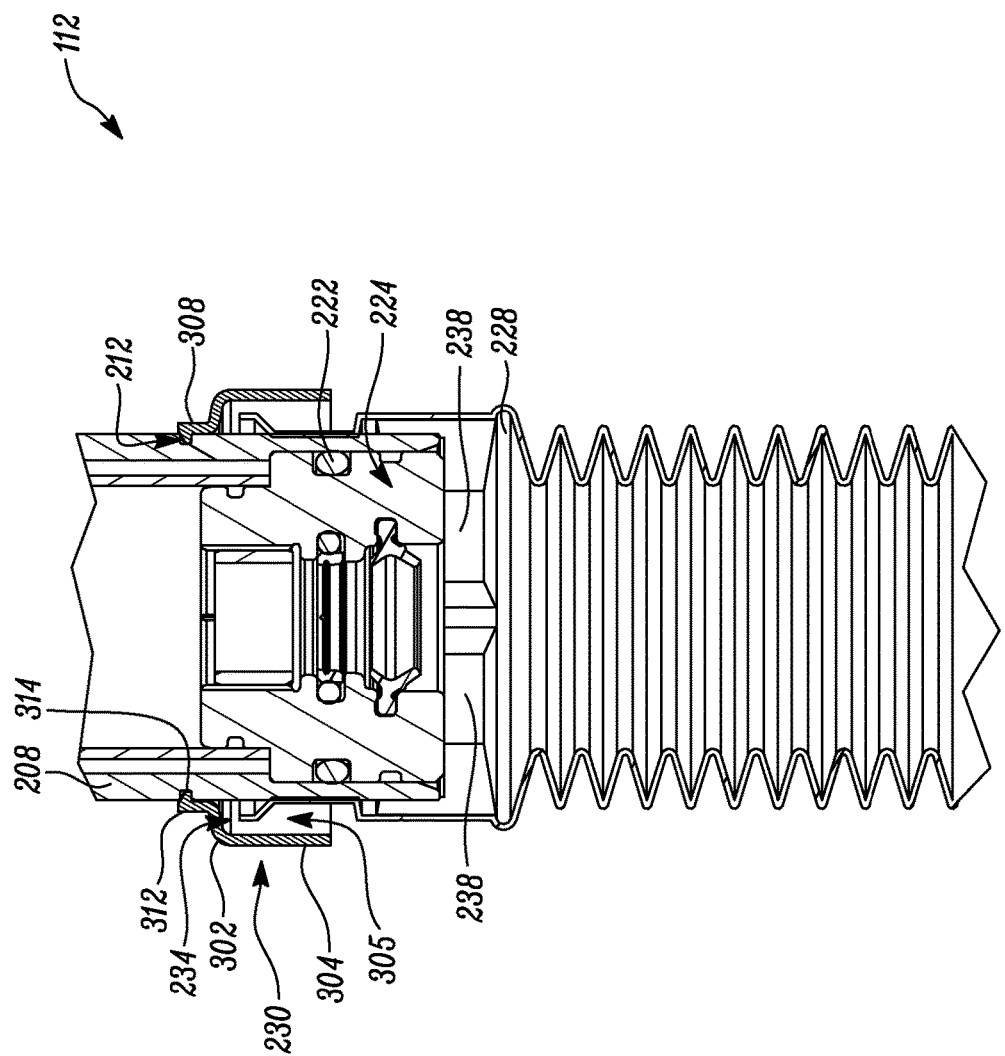
FIG. 6 is a sectional view of a portion of the damper shown in FIG. 2 illustrating the cap of FIGS. 4 and 5 connected to the damper.

The cap 230 also includes a plurality of connecting tabs 312 that are spaced apart from each other. More particularly, the connecting tabs 312 are circumferentially spaced apart from each other. In the illustrated embodiment, the cap 230 includes four connecting tabs 312. However, a total number of the connecting tabs 312 may vary as per application requirements. Each connecting tab 312 is disposed between two vertical members 308. In another embodiment, the cap 230 may include a single vertical member that surrounds the outer surface 214 of the outer tube 208. The single vertical member may include a plurality of slots, such that each of the plurality of slots receives the corresponding connecting tab 312. Therefore, a portion of the single vertical member crosses over each of the connecting tabs 312 above the connecting tabs 312. Each of the connecting tabs 312 include a projection 314 that detachably connects to the groove 212 (see FIG. 6) of the outer tube 208. As shown in FIG. 6, the cap 230 is detachably connected to the outer tube 208. For example, the cap 230 may be connected to the outer tube 208 by a snap-fit connection. More particularly, the projection 314 on the corresponding connecting tabs 312 are received within the groove 212 of the outer tube 208 to form a snap-fit connection for detachably connecting the cap 230 with the outer tube 208. Such a detachable connection allows easy and quick removal of the cap 230 for servicing, maintenance, or replacement of the cap 230 or the dust tube 228. It should be further noted that the cap 230 may be connected to the outer tube 208 by other connection methods such as, adhesives, interference fit, and so forth.

Figure 7:
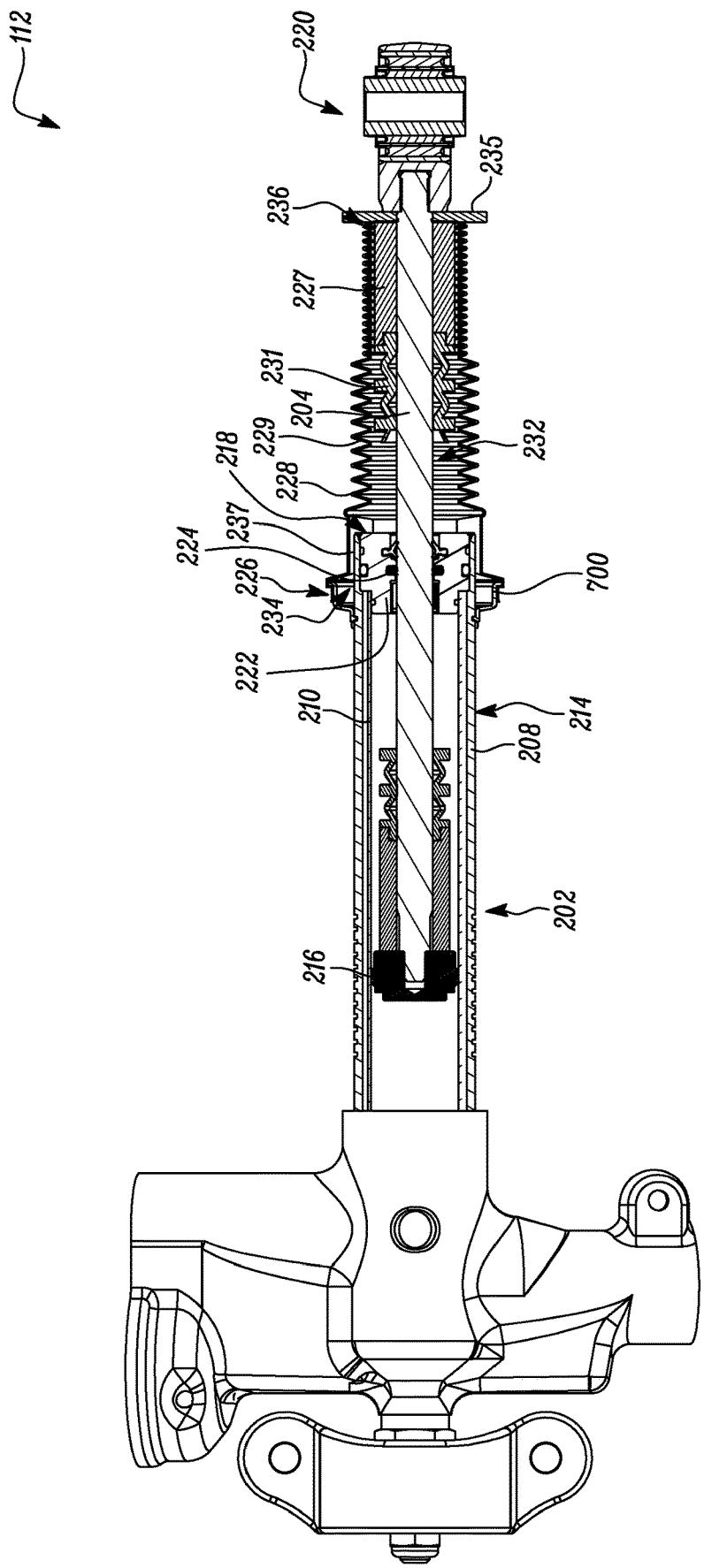
FIG. 7 is a sectional view illustrating another design of the cap assembled with the dust tube, according to an aspect of the present disclosure.
Figure 8:
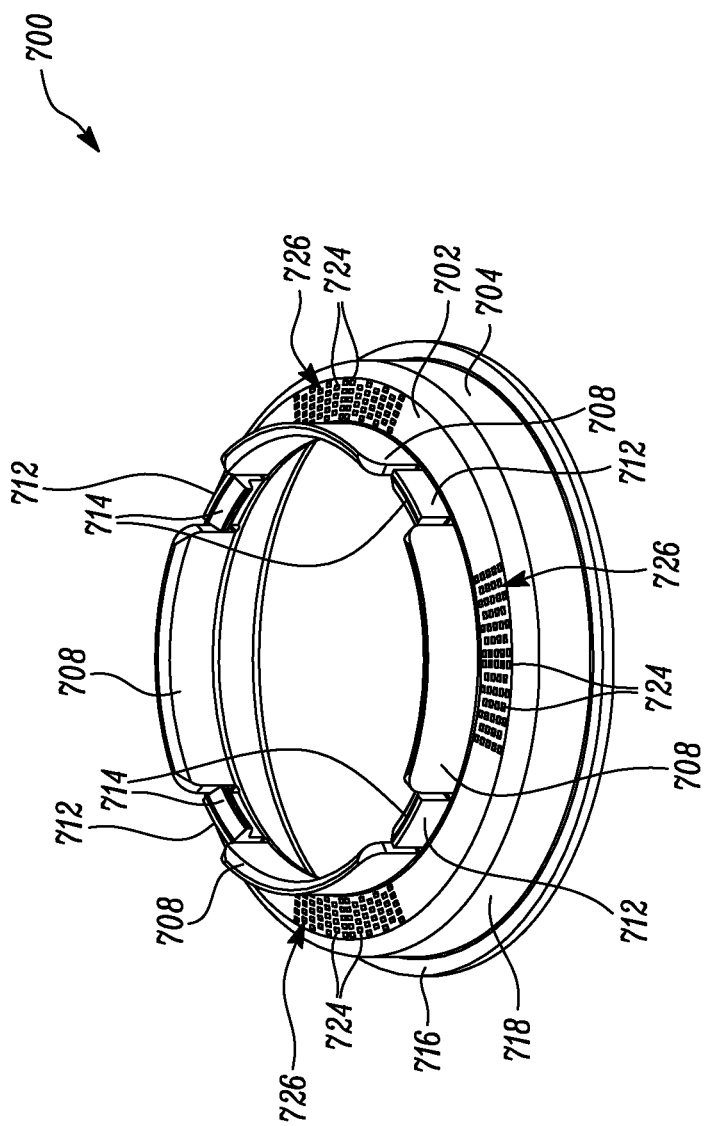
FIG. 8 is an illustration of the cap shown in FIG. 7, according to an aspect of the present disclosure.
Figure 9:
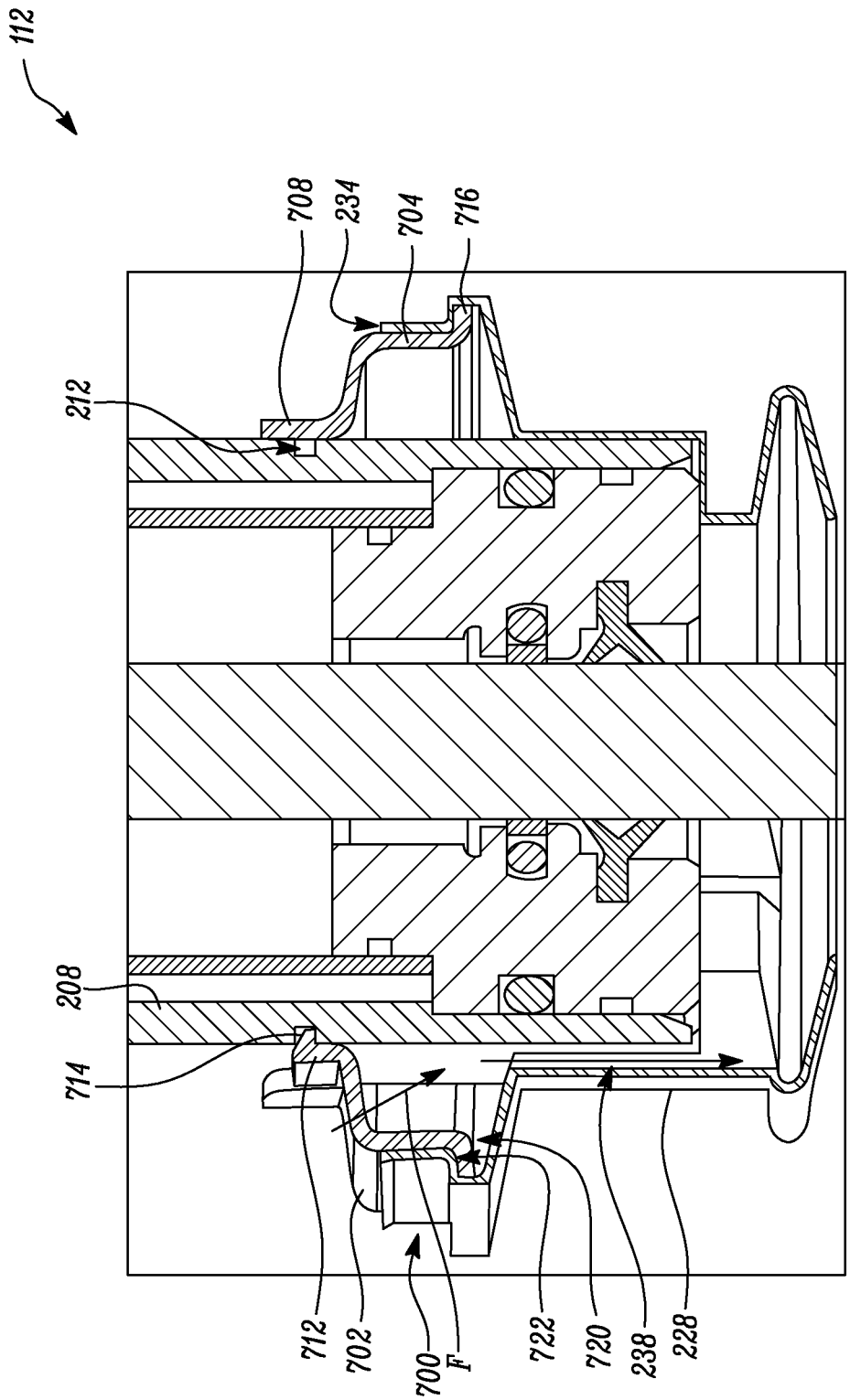
FIG. 9 is a sectional view of a portion of the damper shown in FIG. 2 illustrating the cap of FIG. 8 connected to the damper.

FIGS. 7, 8, and 9 illustrate another embodiment of the cap 700. The cap 700 is embodied as a single piece component. The cap 700 is connected to the outer tube 208 and at least partially covers the first end 234 of the dust tube 228. More particularly, the cap 700 may include an arrangement that allows venting of the dust tube 228. Further, the cap 700 is connected to the dust tube 228. As shown in FIG. 8, the cap 700 includes the connecting tabs 712 with projections 714 that connect by a snap-fit connection with the outer tube 208 (see FIG. 9) similar to the connecting tabs 312 with projections 314 of the cap 230 (shown in FIGS. 4 and 5). The cap 700 also includes the cover portion 702 similar to the cover portion 302 of the cap 230 and a number of vertical members 708 similar to the vertical members 308 of the cap 230. Further, the cap 700 includes an extending portion 704. The extending portion 704 extends from the cover portion 702 towards the dust tube 228 (shown in FIG. 9). More particularly, the extending portion 704 extends vertically downwards from a lower surface (not shown) of the cover portion 702.

Further, in the illustrated embodiment, the cap 700 is connected to the dust tube 228 such that the dust tube 228 is isolated from the environment. This isolation of the dust tube 228 prevents entry and expulsion of air from the dust tube 228. Thus, in order to provide fluid communication between the dust tube 228 and the environment, the cap 700 includes a plurality of through apertures 724. More particularly, the cap 700 includes a number of sets 726 having the through apertures 724. In the illustrated embodiment, the cap 700 includes four sets 726 having the through apertures 724. The through apertures 724 perform the function of venting the dust tube 228 (see FIG. 2) as the cap 700 described in this embodiment otherwise isolates the damper 112 from the environment. The through apertures 724 allow passage of air through them thereby allowing entry and expulsion of air during compression and expansion of the bellows 229 (see FIGS. 2 and 3) of the dust tube 228. Referring to FIG. 9, a flow path "F" of air entering and flowing through the dust tube 228 is illustrated. Air introduced at the first end 234 of the cap 1000 via the through apertures 724 (see FIG. 8) flows through the channels 238 and enters the dust tube 228. Further, air may be expelled out of the dust tube 228 via the channels 238 such that air travels out through the first end 234. Air may be then discharged to the environment via the through apertures 724 of the cap 700. A size of the through apertures 724 are such that the through apertures 724 only allow passage of air and prevent passage of other contaminants through them.

The extending portion 704 is connected to the dust tube 228. More particularly, the extending portion 704 includes a flange portion 716. The flange portion 716 extends outward from an outer surface 718 (shown in FIG. 8) of the extending portion 704. The flange portion 716 is received within a passage 720 of the dust tube 228 for connecting the cap 700 with the dust tube 228. In an assembled condition of the damper 112, the flange portion 716 engages with a groove 722 defined by the dust tube 228 for connecting the cap 700 with the dust tube 228. More particularly, for connecting the cap 700 with the dust tube 228, the cap 700 is inserted into the dust tube 228 such that the flange portion 716 engages and locks with the dust tube 228. Thus, the dust tube 228 and the cap 700 may be received by an end user as an assembly thereby eliminating an additional production step of assembling the dust tube 228 and the cap 700. Further, during an assembly of the damper 112, the projections 714 of the cap 700 connects with the groove 212 of the outer tube 208 for connecting the cap 700 with the outer tube 208.

Figure 10:
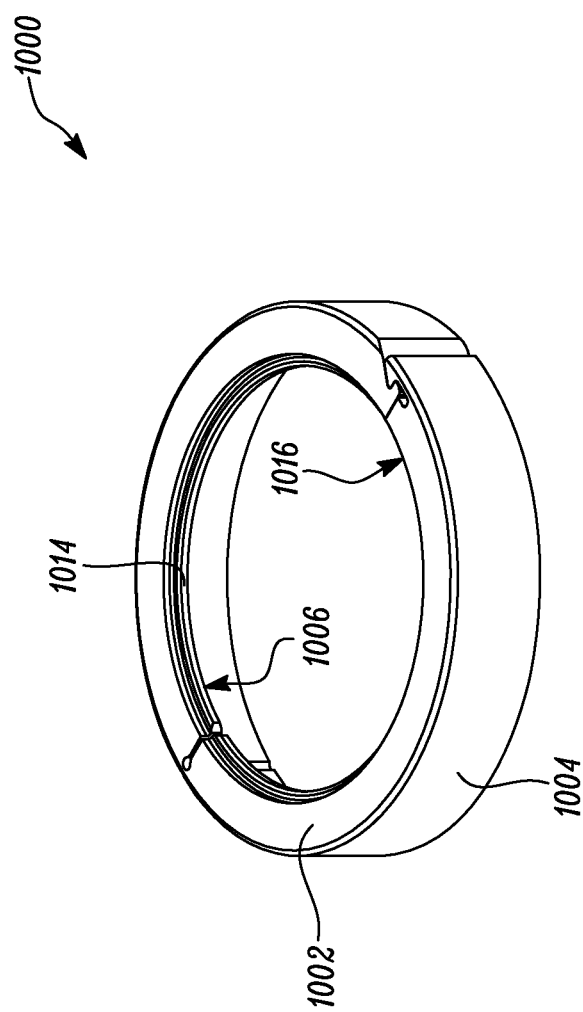
FIG. 10 is an illustration of another design of the cap associated with the damper of FIG. 2, according to an aspect of the present disclosure.
Figure 11:
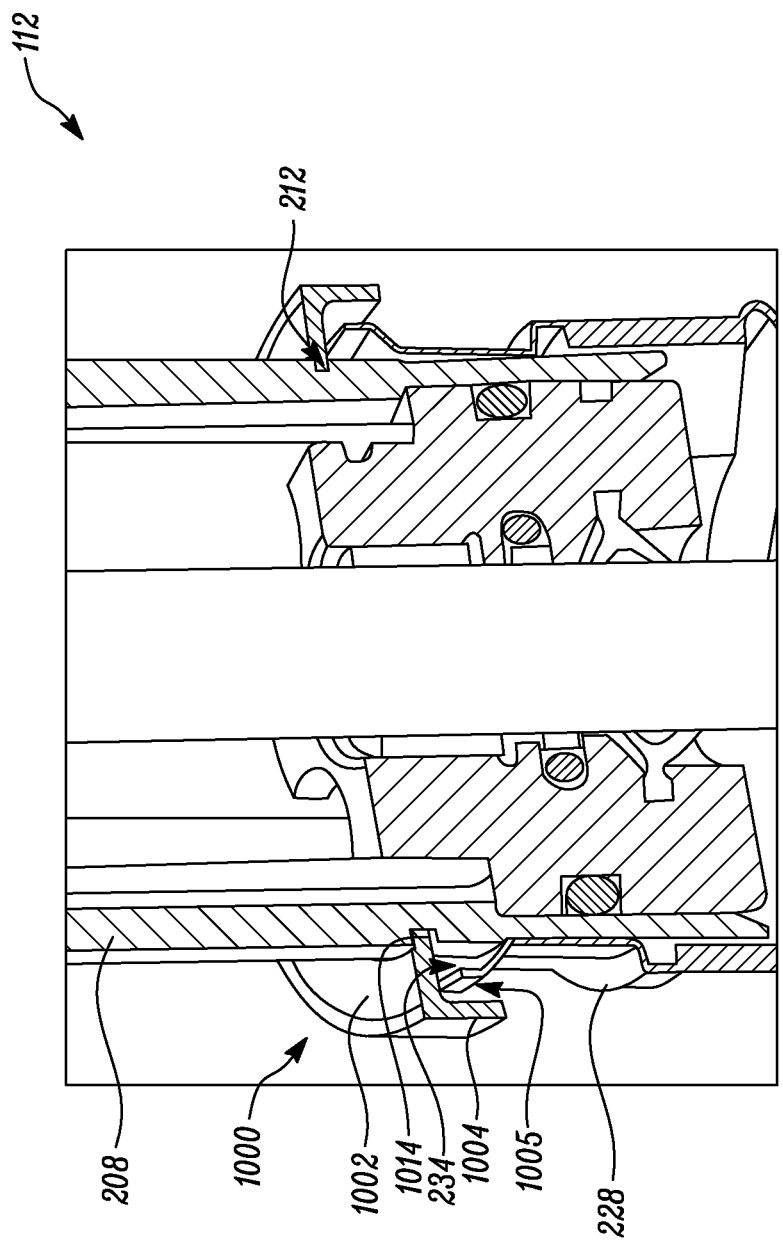
FIG. 11 is a sectional view of a portion of the damper shown in FIG. 2 illustrating the cap of FIG. 10 connected to the damper, according to an aspect of the present disclosure.

Referring to FIGS. 10 and 11, another embodiment of the cap 1000 is shown. The cap 1000 is embodied as a single piece component. The cap 1000 is connected to the outer tube 208 and at least partially covers the first end 234 (see FIG. 11) of the dust tube 228. More particularly, the cap 1000 may include an arrangement that allows venting of the dust tube 228. The cap 1000 includes a cover portion 1002 and an extending portion 1004. The cover portion 1002 is disposed around the outer tube 208 and at least partially covers the first end 234 of the dust tube 228. The cover portion 1002 may be concentric with the outer tube 208. The cover portion 1002 is embodied as an annular ring. Further, the extending portion 1004 extends from the cover portion 1002 towards the dust tube 228. Referring to FIG. 10, the extending portion 1004 extends vertically downwards from a lower surface 1006 of the cover portion 1002. In the illustrated embodiment, the extending portion 1004 is spaced apart from the dust tube 228 (see FIG. 11). More particularly, the extending portion 1004 is radially spaced apart from the dust tube 228. The extending portion 1004 and the dust tube 228 define a space 1005 therebetween. The space 1005 allows venting of the dust tube 228. More particularly, the space 1005 allows entry and expulsion of air from the dust tube 228 during compression and expansion of the bellows 229 (see FIGS. 2 and 3) of the dust tube 228.

Further, the cap 1000 incudes a projection 1014. The projection 1014 is embodied as an annular projection. The projection 1014 extends from an inner surface 1016 of the cover portion 1002. The projection 1014 detachably connects to the groove 212 (see FIG. 11) of the outer tube 208. Alternatively, the cap 1000 may include a plurality of projections 1014 that are circumferentially spaced apart from each other and are detachably connected to the groove 212. As shown in FIG. 11, the cap 1000 is detachably connected to the outer tube 208. More particularly, the cap 1000 may be connected to the outer tube 208 by a snap-fit connection. The projection 1014 is received within the groove 212 of the outer tube 208 to form a snap-fit connection for detachably connecting the cap 1000 with the outer tube 208. Such a detachable connection allows easy and quick removal of the cap 1000 for servicing, maintenance, or replacement of the cap 1000 or the dust tube 228.

Figure 12:
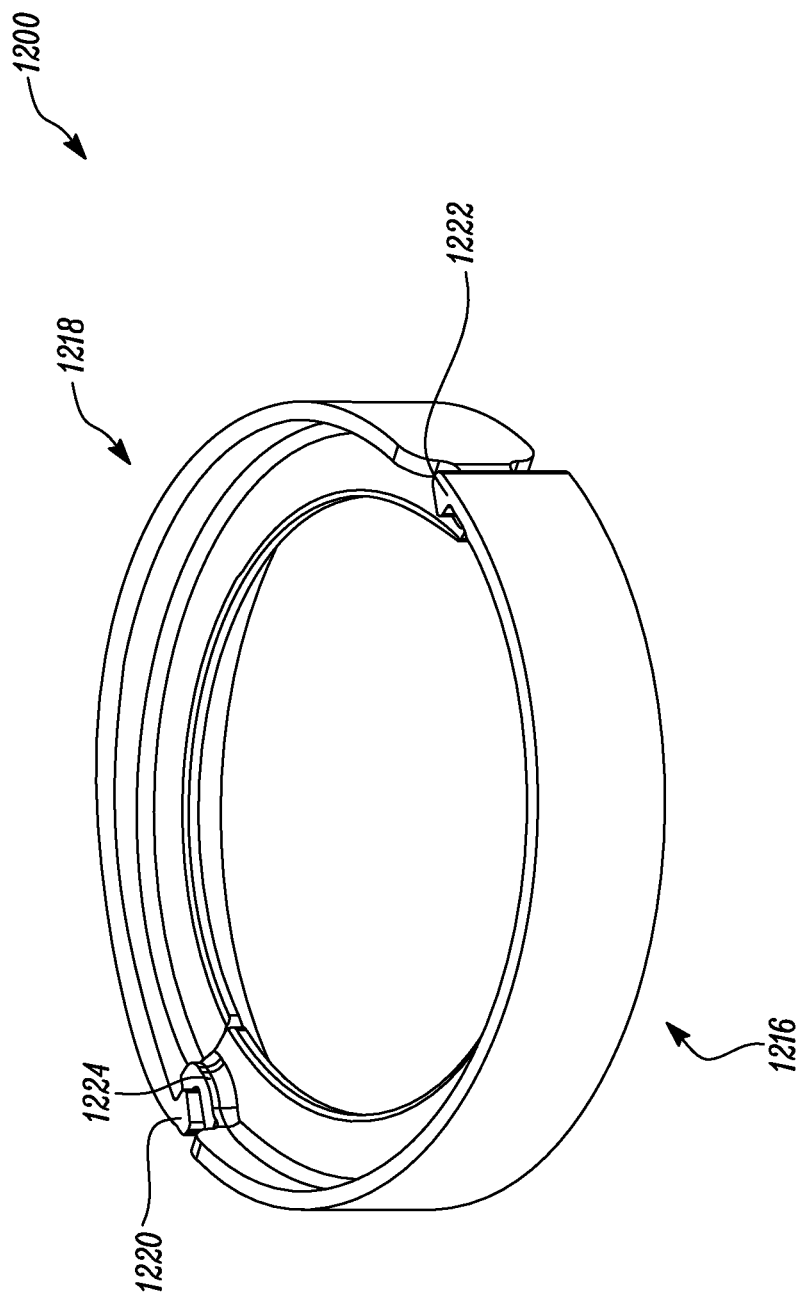
FIG. 12 is an assembled view of another design of the cap associated with the damper of FIG. 2, according to an aspect of the present disclosure.
Figure 13:
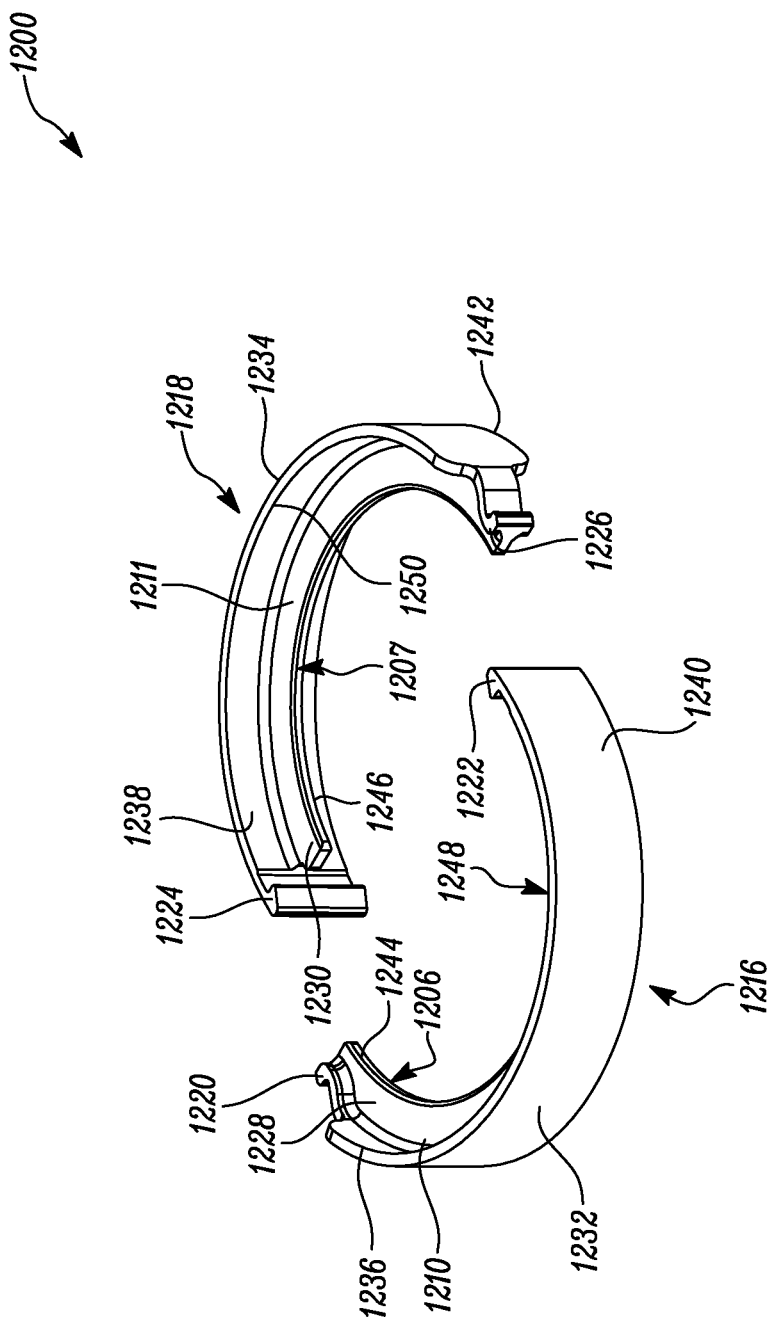
FIG. 13 is a disassembled view of the cap shown in FIG. 12.
Figure 14:
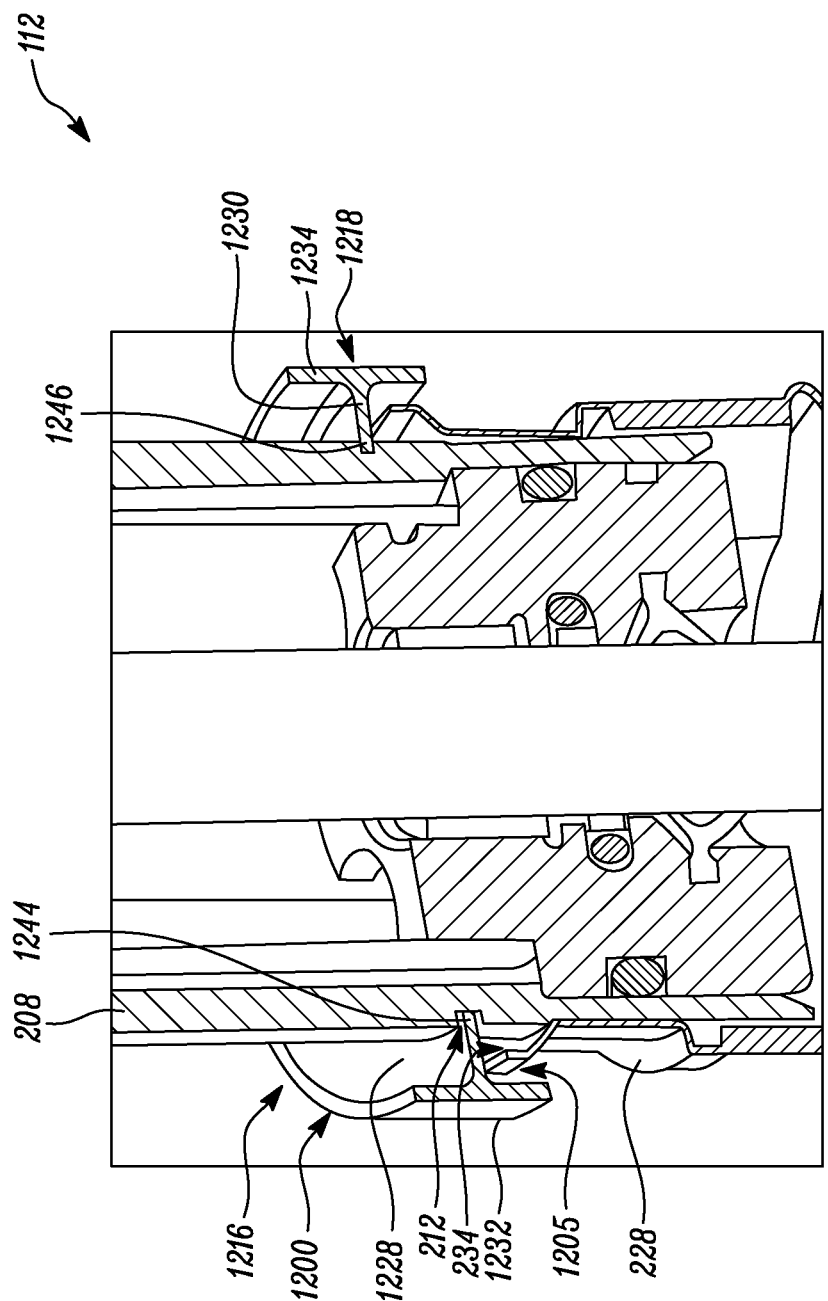
FIG. 14 is a sectional view illustrating the cap shown in FIGS. 12 and 13.

Referring to FIGS. 12, 13, and 14, another embodiment of the cap 1200 is shown. The cap 1200 is embodied as a two-piece component. The cap 1200 is connected to the outer tube 208 and at least partially covers the first end 234 (see FIG. 14) of the dust tube 228. More particularly, the cap 1200 may include an arrangement that allows venting of the dust tube 228. As shown in FIG. 12, the cap 1200 includes a first part 1216 and a second part 1218. The second part 1218 is connected to the first part 1216 by a snap-fit connection. More particularly, the first part 1216 includes a first hook 1220 and a second hook 1222. Further, the second part 1218 includes a third hook 1224 and a fourth hook 1226 (see FIG. 13). The first hook 1220 engages with the third hook 1226 whereas the second hook 1222 engages with the fourth hook 1224 for connecting the second part 1218 to the first part 1216 by the snap-fit connection.

Referring now to FIG. 13, each of the first and second parts 1216, 1218 include a first cover portion 1228 and a second cover portion 1230, respectively. Each of the first and second parts 1216, 1218 also include a first extending portion 1232 and a second extending portion 1234. The first and second cover portions 1228, 1230 are disposed around the outer tube 208 (see FIG. 14) and at least partially covers the first end 234 (see FIG. 14) of the dust tube 228 (see FIG. 14). The first and second cover portions 1228, 1230 may be concentric with the outer tube 208. In an assembled condition of the cap 1200, the first and second cover portions 1228, 1230 form an annular ring.

Further, the first and second extending portions 1232, 1234 extend from the cover portion 1002 towards the dust tube 228. In this embodiment, the first and second extending portions 1232, 1234 are provided such that the first and second cover portions 1228, 1230 are perpendicular to the first and second extending portions 1232, 1234. More particularly, upper portions 1236, 1238 of the first and second cover portions 1228, 1230 extend vertically upwards from upper surfaces 1210, 1211 of the first and second cover portions 1228, 1230, respectively. Further, lower portions 1240, 1242 of the first and second cover portions 1228, 1230 extend vertically downwards from lower surfaces 1206, 1207 of the first and second cover portions 1228, 1230, respectively. In the illustrated embodiment, the first and second extending portions 1232, 1234 are spaced apart from the dust tube 228. More particularly, the first and second extending portions 1232, 1234 are radially spaced apart from the dust tube 228. The extending portion 304 and the dust tube 228 define a space 1205 (shown in FIG. 14) therebetween. The space 1205 may completely surround the outer tube 208. Alternatively, the space 1205 may partially surround the outer tube 208. The space 1205 allows venting of the dust tube 228. The space 1205 allows entry and expulsion of air from the dust tube 228 during compression and expansion of the bellows 229 (see FIGS. 2 and 3) of the dust tube 228. More particularly, air introduced at the first end 234 of the cap 1200 via the space 1205 flows through the channels 238 (see FIG. 9) and enters the dust tube 228. Further, air may be expelled out of the dust tube 228 via the channels 238 such that air travels out through the first end 234 and the space 1205 and is discharged to the environment.

The cap 1200 incudes a first projection 1244 and a second projection 1246. When assembled, the first and second projections 1244, 1246 define a single annular projection. The first and second projections 1244, 1246 extend from an inner surface 1248, 1250 of the respective first and second cover portions 1228, 1230. As shown in FIG. 14, the first and second projections 1244, 1246 detachably connect to the groove 212 of the outer tube 208. It should be noted that the cap 1200 is detachably connected to the outer tube 208. More particularly, the cap 1200 may be connected to the outer tube 208 by a snap-fit connection. The first and second projections 1244, 1246 are received within the groove 212 of the outer tube 208 to form a snap-fit connection for detachably connecting the cap 1200 with the outer tube 208. Such a detachable connection allows easy and quick removal of the cap 1200 for servicing, maintenance, or replacement of the cap 1200 or the dust tube 228.

Figure 15:
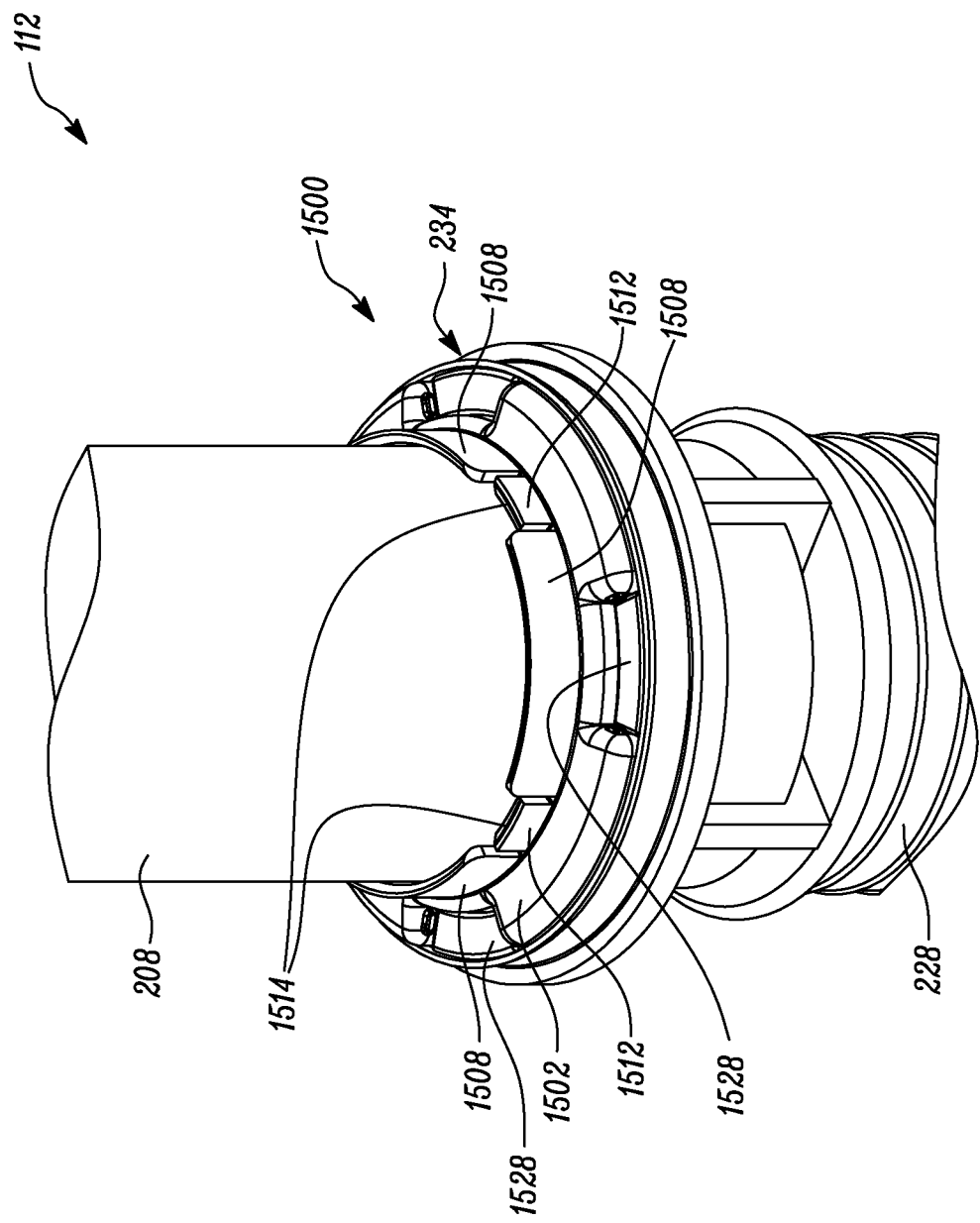
FIG. 15 is a perspective view of a portion of the damper shown in FIG. 2 illustrating another design of the cap assembled with the dust tube, according to an aspect of the present disclosure.
Figure 16:
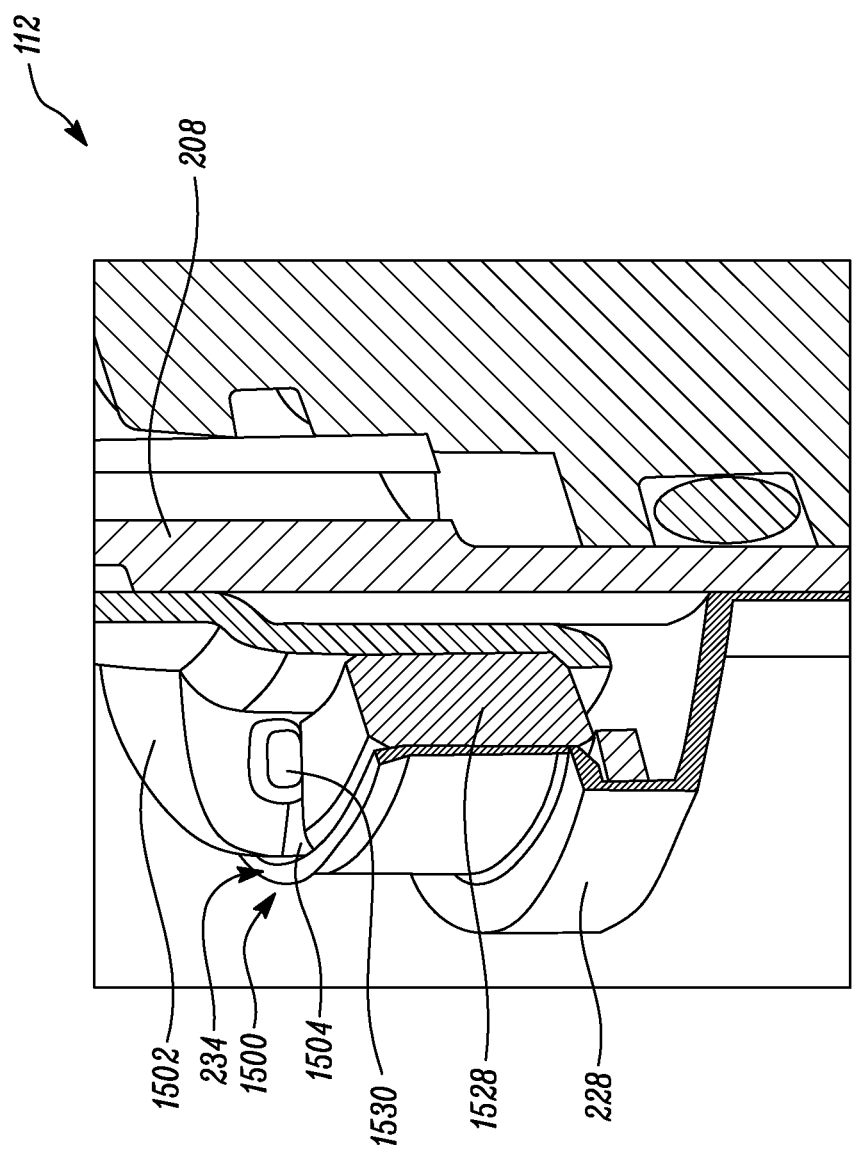
FIGS. 16 and 17 illustrate the cap of FIG. 15 assembled with the dust tube.
Figure 17:
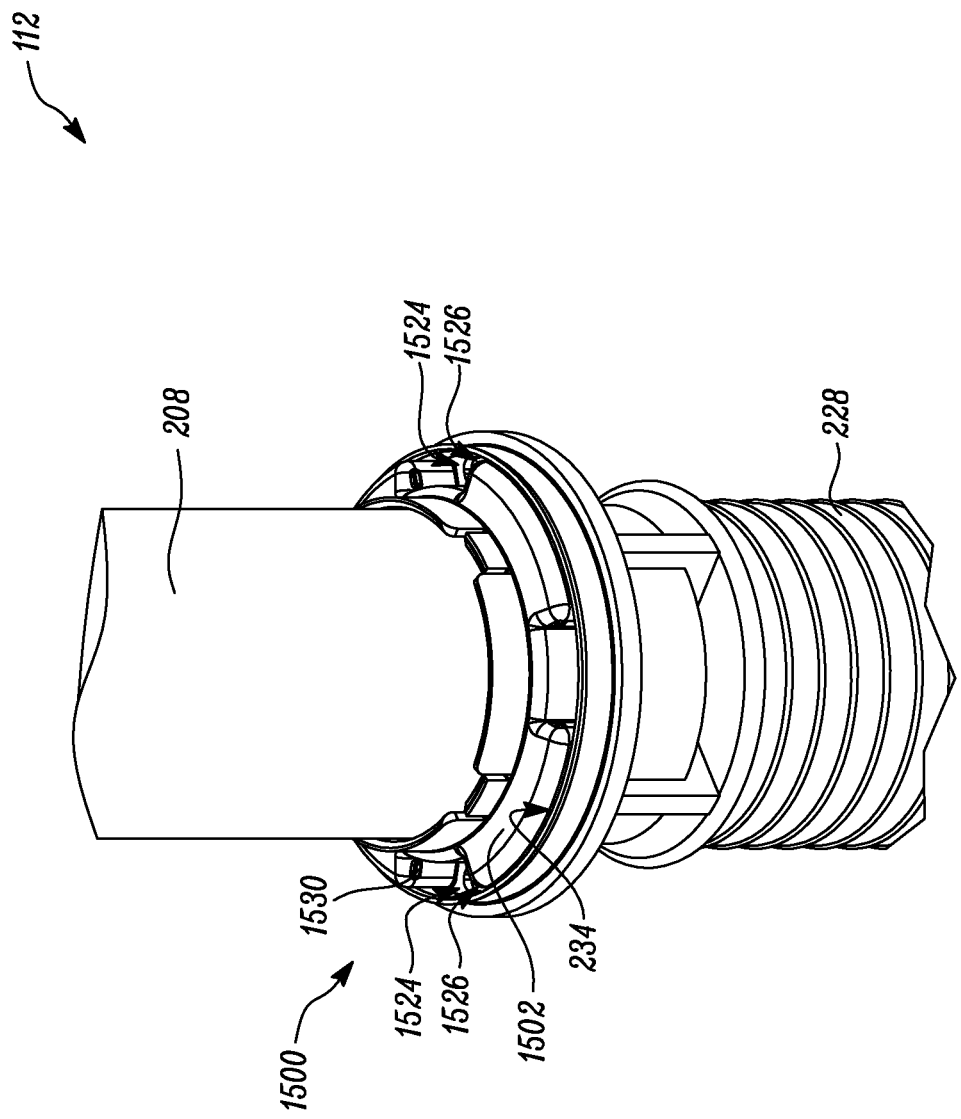

FIGS. 15, 16, and 17 illustrate another embodiment of the present disclosure. The cap 1500 is embodied as a single piece component. Referring to FIG. 15, the cap 1500 is connected to the outer tube 208 and at least partially covers the first end 234 of the dust tube 228. More particularly, the cap 1500 may include an arrangement that allows venting of the dust tube 228. Further, the cap 1500 is connected to the dust tube 228. The cap 1500 includes the connecting tabs 1512 with projections 1514 that connect by a snap-fit connection with the outer tube 208 similar to the connecting tabs 312 with projections 314 of the cap 230 shown in FIGS. 4 and 5. The cap 1500 also includes the cover portion 1502 similar to the cover portion 302 of the cap 230 and a number of vertical members 1508 similar to the vertical members 1508 of the cap 230. As shown in FIG. 16, the cap 1500 includes an extending portion 1504. The extending portion 1504 extends from the cover portion 1502 towards the dust tube 228. More particularly, the extending portion 1504 extends vertically downwards from a lower surface (not shown) of the cover portion 1502.

In the illustrated embodiment, the extending portion 1504 is connected to the dust tube 228. More particularly, the extending portion 1504 includes a flange portion (not shown) similar to the flange portion 716 (see FIG. 9) of the cap 700 (see FIG. 9). The flange portion extends outward from an outer surface (not shown) of the extending portion 1504. The flange portion is received within a passage (not shown) of the dust tube 228 for connecting the cap 1500 with the dust tube 228. In an assembled condition of the damper 112, the flange portion engages with a groove (not shown) defined by the dust tube 228 for connecting the cap 1500 with the dust tube 228. More particularly, for connecting the cap 1500 with the dust tube 228, the cap 1500 is inserted into the dust tube 228 such that the flange portion engages and locks with the dust tube 228. Thus, the dust tube 228 and the cap 1500 may be received by an end user as an assembly thereby eliminating an additional production step of assembling the dust tube 228 and the cap 1500. Further, during an assembly of the damper 112, the projections 1514 of the cap 1500 connects with the groove 212 (see FIG. 6) of the outer tube 208 for connecting the cap 1500 with the outer tube 208.

As shown in FIG. 17, the cap 1500 includes a plurality of slots 1524 spaced apart from each other. In the illustrated embodiment, the cap 1500 includes four slots 1524. However, the cap 1500 may include more than four slots 1524 or less than four slots 1524. Further, the cap 1500 also includes a plurality of recesses 1526 spaced apart from each other. In the illustrated embodiment, the cap 1500 includes four recesses 1526. However, the cap 1500 may include more than four recesses 1526 or less than four recesses 1526. Each of the number of recesses 1526 are disposed adjacent to a corresponding slot 1524 of the number of slots 1524. It should be noted that a total number of slots 1524 corresponds to a total number of the recesses 1526. The slots 1524 allow air that is filtered by filter inserts 1528 of the cap 1500 to flow therethrough. Air introduced at the first end 234 of the cap 1500 via the filter inserts 1528 flows through the channels 238 (see FIG. 9) and enters the dust tube 228. Further, air may be expelled out of the dust tube 228 via the channels 238 such that air travels out through the first end 234. Air may be then discharged to the environment via the filter inserts 1528 of the cap 1500.

Further, each of the number of recesses 1526 receives the filter insert 1528. In the illustrated embodiment, the cap 1500 includes four filter inserts 1528 corresponding to the number of recesses 1526 and the number of slots 1524. As the cap 1500 described in this embodiment otherwise isolates the damper 112 from the environment, the filter inserts 1528 provide venting of the dust tube 228 by allowing passage of air through them and at the same time preventing passage of contaminants through them. Further, each of the filter inserts 1528 may include a metallic mesh filter, a polymeric filter, a fabric filter, etc. In one example, the filter inserts 1528 may be made of urethane. For inserting the filter inserts 1528 in the cap 1500, the filter inserts 1528 are aligned and inserted through the corresponding slots 1524 such that the filter inserts 1528 are received within the corresponding recesses 1526. In an embodiment, each of the filter inserts 1528 is retained in the corresponding slot 1524 by a pair of tabs 1530 (one shown in FIG. 16). The tabs 1530 allow the filter inserts 1528 to be snapped in and received within the corresponding slots 1524. It should be noted that the filter inserts 1528 can be easily assembled by a personnel by simply pressing the filter inserts 1528 with hand without requiring any tools or devices.

As mentioned above, the caps 230, 700, 1000, 1200, 1300, 1500 are detachably connected to the outer tube 208 which allows easy and quick replacement of the caps 230, 700, 1000, 1200, 1300, 1500 for servicing or replacement purposes. It should be noted that each of the caps 230, 700, 1000, 1200, 1300, 1500 can be formed from plastic, metal, a composite material, or any suitable material. It should be further noted that each of the caps 230, 700, 1000, 1200, 1300, 1500 described above may be manufactured using any known low-cost manufacturing process, such as molding. For example, each of the caps 230, 700, 1000, 1200, 1300, 1500 may be manufactured by an injection molding process or a blow molding process. Alternatively, an additive manufacturing process may also be used to manufacture each of the caps 230, 700, 1000, 1200, 1300, 1500. Further, each of the caps 230, 700, 1000, 1200, 1300, 1500 can be easily assembled with the outer tube 208 by a personnel without requiring any additional tools or devices.

Each of the caps 230, 700, 1000, 1200, 1300, 1500 provides a low-cost solution for protecting critical components of the damper 112, such as the piston rod 204, thereby reducing customer complaints and warranty costs. Additionally, the number of warranty returns because of oil seal contamination is reduced as the sealing arrangement 222 does not get contaminated because of dust ingress. Furthermore, the caps 230, 700, 1000, 1200, 1300, 1500 described herein exhibit improved robustness against environmental conditions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A cover system for a damper having an outer tube and a piston rod extending from an end of the outer tube, the cover system comprising:
   a dust tube disposed around a portion of the outer tube, the dust tube comprising a first end located proximal to the end of the outer tube and a second end opposite to the first end, the dust tube at least partially enclosing the piston rod; and
   a cap connected to the outer tube, wherein the cap is adapted to at least partially cover the first end of the dust tube, wherein the cap comprises:
     one or more projections adapted to be detachably connected to a groove of the outer tube;
     a plurality of slots spaced apart from each other; and
     a plurality of recesses spaced apart from each other, wherein each of the plurality of recesses is disposed adjacent to a corresponding slot of the plurality of slots, and wherein each of the plurality of recesses is adapted to receive a filter insert.

2. The cover system of claim 1, wherein the cap is connected to the dust tube.

3. The cover system of claim 1, wherein the cap comprises a plurality of connecting tabs spaced apart from each other, each of the plurality of connecting tabs including one of the one or more projections.

4. The cover system of claim 1, wherein the cap comprises a first part and a second part connected to the first part by a snap-fit connection.

5. The cover system of claim 1, wherein the cap comprises:
   a cover portion disposed around the outer tube and adapted to at least partially cover the first end of the dust tube; and
   an extending portion extending from the cover portion towards the dust tube.

6. The cover system of claim 5, wherein the extending portion is connected to the dust tube.

7. The cover system of claim 5, wherein the extending portion is spaced apart from the dust tube.

8. The cover system of claim 1, wherein the cap comprises a plurality of through apertures.

9. The cover system of claim 1, wherein the dust tube further comprises a plurality of channels disposed proximal to the first end of the dust tube.

10. A damper comprising:
    an outer tube;
    a piston rod extending from an end of the outer tube;
    a dust tube disposed around a portion of the outer tube, the dust tube comprising a first end located proximal to the end of the outer tube and a second end opposite to the first end, the dust tube at least partially enclosing the piston rod; and
    a cap connected to the outer tube, the cap adapted to at least partially cover the first end of the dust tube, wherein the cap comprises:
      one or more projections adapted to be detachably connected to a groove of the outer tube;
      a plurality of slots spaced apart from each other; and
      a plurality of recesses spaced apart from each other, wherein each of the plurality of recesses is disposed adjacent to a corresponding slot of the plurality of slots, and wherein each of the plurality of recesses is adapted to receive a filter insert.

11. The damper of claim 10, wherein the cap is connected to the dust tube.

12. The damper of claim 10, wherein the cap comprises a plurality of connecting tabs spaced apart from each other, each of the plurality of connecting tabs including one of the one or more projections.

13. The damper of claim 10, wherein the cap comprises a first part and a second part connected to the first part by a snap-fit connection.

14. The damper of claim 10, wherein the cap comprises:
    a cover portion disposed around the outer tube and adapted to at least partially cover the first end of the dust tube; and
    an extending portion extending from the cover portion towards the dust tube, wherein the extending portion is at least one of connected to the dust tube and spaced apart from the dust tube.

15. The damper of claim 10, wherein the cap comprises a plurality of through apertures.

16. The damper of claim 10, wherein the cap comprises:
    a plurality of slots spaced apart from each other; and
    a plurality of recess spaced apart from each other, wherein each of the plurality of recesses is disposed adjacent to a corresponding slot of the plurality of slots, and wherein each of the plurality of recesses adapted to receive a filter insert.

17. A cover system for a damper having an outer tube and a piston rod extending from an end of the outer tube, the cover system comprising:
    a dust tube disposed around a portion of the outer tube, the dust tube comprising a first end located proximal to the end of the outer tube and a second end opposite to the first end, the dust tube comprising a plurality of channels disposed proximal to the first end of the dust tube; the dust tube at least partially enclosing the piston rod;
    and a cap connected to the outer tube, wherein the cap is adapted to at least partially cover the first end of the dust tube, wherein the cap comprises one or more projections adapted to be detachably connected to a groove of the outer tube.

18. The cover system of claim 17, wherein the cap is connected to the dust tube.

19. The cover system of claim 17, wherein the cap comprises a projection adapted to be detachably connected to a groove of the outer tube.

20. The cover system of claim 17, wherein the cap comprises a plurality of connecting tabs spaced apart from each other, each of the plurality of connecting tabs including one of the one or more projections.

* * * * *